(12) United States Patent
Maeshima et al.

(10) Patent No.: US 11,106,407 B2
(45) Date of Patent: Aug. 31, 2021

(54) MEDIA PROCESSING APPARATUS AND METHOD OF CONTROLLING MEDIA PROCESSING APPARATUS

(71) Applicant: SEIKO EPSON CORPORATION, Tokyo (JP)

(72) Inventors: Hidetoshi Maeshima, Shiojiri (JP); Sadaaki Horiuchi, Okaya (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/103,628

(22) Filed: Nov. 24, 2020

(65) Prior Publication Data

US 2021/0155011 A1 May 27, 2021

(30) Foreign Application Priority Data

Nov. 26, 2019 (JP) .............................. JP2019-213001

(51) Int. Cl.
*G06F 3/12* (2006.01)
*B41J 3/407* (2006.01)

(52) U.S. Cl.
CPC .......... *G06F 3/1243* (2013.01); *B41J 3/4075* (2013.01); *G06F 3/128* (2013.01); *G06F 3/1253* (2013.01); *G06F 3/1274* (2013.01)

(58) Field of Classification Search
None
See application file for complete search history.

(56) References Cited

U.S. PATENT DOCUMENTS

| | | | | |
|---|---|---|---|---|
| 2007/0253036 A1* | 11/2007 | Matsunaga | ........ | H04N 1/00477 358/497 |
| 2009/0092022 A1* | 4/2009 | Nishioka | ................ | G11B 17/10 369/69 |
| 2012/0229854 A1* | 9/2012 | Maeshima | ............. | G11B 23/40 358/1.15 |

FOREIGN PATENT DOCUMENTS

| | | |
|---|---|---|
| JP | 2012-190511 | 10/2012 |
| JP | 2014-063542 | 4/2014 |

* cited by examiner

*Primary Examiner* — Lennin R Rodriguezgonzalez
(74) *Attorney, Agent, or Firm* — Workman Nydegger

(57) ABSTRACT

A media processing apparatus has N medium drives (N is an integer equal to or greater than 2), a label printer, and a medium-processing-apparatus control section. When K, which indicates the number of media on which to perform media creation (K is an integer not greater than 2N), is greater than N, the medium-processing-apparatus control section writes a first photographic data file and a second photographic data file to N media at the time when they are received. After writing has been terminated, the medium-processing-apparatus control section performs printing on the label surfaces of the N media. After writing to the N media is terminated, the medium-processing-apparatus control section writes the stored first photographic data file and second photographic data file to (K–N) media.

10 Claims, 6 Drawing Sheets

MEDIA PROCESSING APPARATUS AND METHOD OF CONTROLLING MEDIA PROCESSING APPARATUS

The present application is based on, and claims priority from JP Application Serial Number 2019-213001, filed Nov. 26, 2019, the disclosure of which is hereby incorporated by reference herein in its entirety.

BACKGROUND

1. Technical Field

The present disclosure relates to a media processing apparatus and a method of controlling the media processing apparatus.

2. Related Art

An apparatus known in related art writes data to a compact disc (CD), a digital versatile disc (DVD), a Blu-ray (registered trademark) disc (BD), or another type of medium, and performs printing on its label surface. In media creation, a media processing apparatus disclosed in, for example, JP-A-2012-190511 acquires print data and an image file from a control apparatus and writes the acquired image file to the medium, after which the media processing apparatus performs printing on the label surface according to the acquired print data.

The media processing apparatus in related art, as described in JP-A-2012-190511, is based on the premise that all write data to be written to a medium is acquired before the media processing apparatus writes the write data to a medium. Therefore, when write data is intermittently sent from the control apparatus, it takes time to acquire all write data. This may prolong the time taken to perform media creation. In particular, when media creation is performed on more media than there are data writing units included in the media processing apparatus, much more time may be needed in media creation.

SUMMARY

One aspect that solves the above problem is a media processing apparatus that communicates with a control apparatus. The media processing apparatus has: N data writing units that write data, N being an integer equal to or greater than 2; a printing unit that performs printing; a control section that controls the N data writing units and the printing unit; a receiving unit that receives, from the control apparatus, first write data, second write data sent after the first write data is sent, and creation count information indicating the number K of media on which to perform media creation, K being an integer not greater than 2N; and a storage section that stores the first write data and the second write data that were received by the receiving section. When K indicated by the creation count information received by the receiving section is greater than N, the control section executes control so that after the receiving section receives the first write data and the second write data, the N data writing units write the first write data and the second write data to the N media, and upon the termination of writing, the printing unit performs printing on the label surfaces of the N media, and also executes control so that after one of the N data writing units terminates writing to one medium, the first write data and second write data stored in the storage section are written to one of (K−N) media.

In the above media processing apparatus, while printing on the label surfaces of the N media is in progress, the control section may start writing to one of the (K−N) media.

In the above media processing apparatus, after media creation is terminated on the K media, the control section may delete the first write data and the second write data from the storage section.

In the above media processing apparatus, the control section may prohibit editing for the first write data and the second write data stored in the storage section.

In the above media processing apparatus, when the receiving section receives, from the control apparatus, a media close command that commands the execution of close processing on the medium, the control section may terminate writing to the N media.

Another aspect that solves the above problem is a method of controlling a media processing apparatus that has N data writing units that write data, N being an integer equal to or greater than 2, and a printing unit that performs printing, the media processing apparatus communicating with a control apparatus. The method includes: receiving, from the control apparatus, first write data and creation count information indicating the number K of media on which to perform media creation, K being an integer not greater than 2N. When K is greater than N, the method also includes: storing the received first write data; writing the first write data to N media by using the N data writing units; receiving, after the first write data is received, second write data from the control apparatus; storing the second write data; adding the second write data to the N media by using the N data writing units; and after writing to the N media is terminated, printing an image on the label surfaces of the N media by using the printing unit, and writing the stored first write data and the stored second write data to (K−N) media.

DESCRIPTION OF EXEMPLARY EMBODIMENTS

Figure 1:
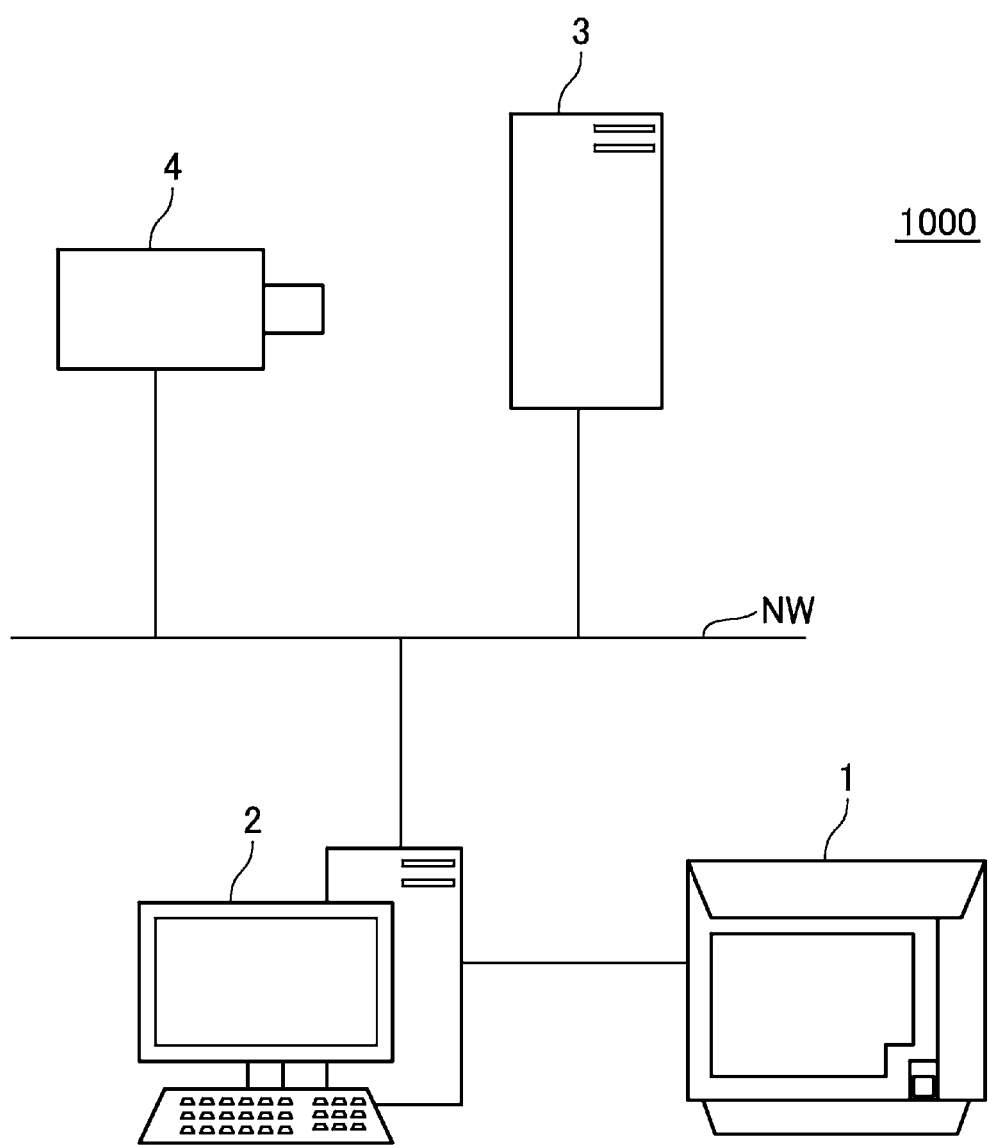
FIG. 1 illustrates the structure of a media processing system.

FIG. 1 illustrates the structure of a media processing system 1000.

The media processing system 1000 has a media processing apparatus 1 and a control apparatus 2 that controls the media processing apparatus 1.

The media processing apparatus 1 performs media creation on a medium M shaped like a circular plate, such as, for example, a CD, DVD, or BD; in media creation, data is written to the medium M and printing is performed on the label surface of the medium M so that data is written to the recording surface of the medium M and an image is printed on the label surface. The media processing apparatus 1 communicates with the control apparatus 2 in compliance with a communication standard such as, for example, a universal serial bus (USB) standard.

The control apparatus 2, which is a computer, causes the media processing apparatus 1 to perform media creation on the medium M so that data is written to the recording surface and an image is printed on the label surface. That is, the control apparatus 2 controls the media processing apparatus 1 to cause it to write data to the medium M and to perform printing on the label surface of the medium M. Although the control apparatus 2 illustrated in FIG. 1 is a desktop computer, the control apparatus 2 may be a laptop computer or tablet computer. The control apparatus 2 is connected to a network NW so that the control apparatus 2 acquires, from a file storage apparatus 3 connected to the network NW, a file to be written to the medium M.

The network NW may be structured with physical lines or with virtual lines such as in a virtual private network (VPN).

Although the media processing system 1000 in FIG. 1 has a single control apparatus 2, the media processing system 1000 may have a plurality of control apparatuses 2.

The file storage apparatus 3 acquires photographic data from a camera 4 through the network NW and stores the acquired photographic data in a file format. Photographic data output from the camera 4 may be video data or may be still picture data. In the description below, photographic data in a file format will be referred to as a photographic data file.

The camera 4 acquires photographic data obtained by photography and outputs the acquired photographic data to the file storage apparatus 3 through the network NW. Specifically, during photography, the camera 4 intermittently outputs photographic data to the file storage apparatus 3 at intervals of a predetermined photography time or in units of a predetermined amount of data.

When, for example, the media processing system 1000 is applied to a court of law and the camera 4 is mounted in a courtroom, the camera 4 photographs the interior of the courtroom in which a judgment is in progress and outputs the resulting photographic data to the file storage apparatus 3. Here, it will be assumed that the judgment is performed in the courtroom for 45 minutes and the camera 4 outputs one photographic data item to the file storage apparatus 3 at 15-minute intervals, so the camera 4 intermittently outputs a total of three photographic data items to the file storage apparatus 3 at 15-minute intervals, one in each 15 minutes.

Figure 2:
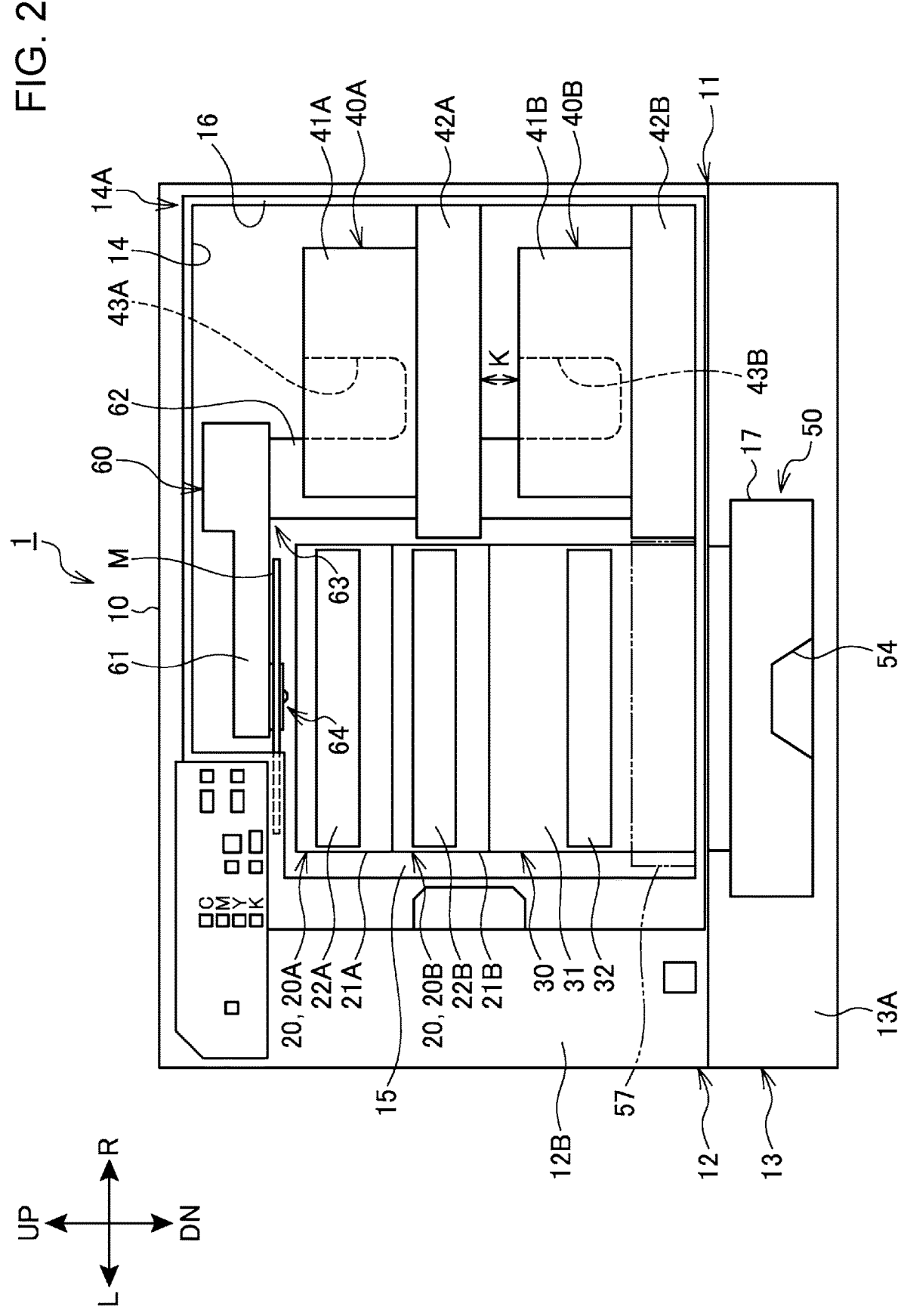
FIG. 2 is a front view illustrating the structure of a media processing apparatus.
Figure 3:
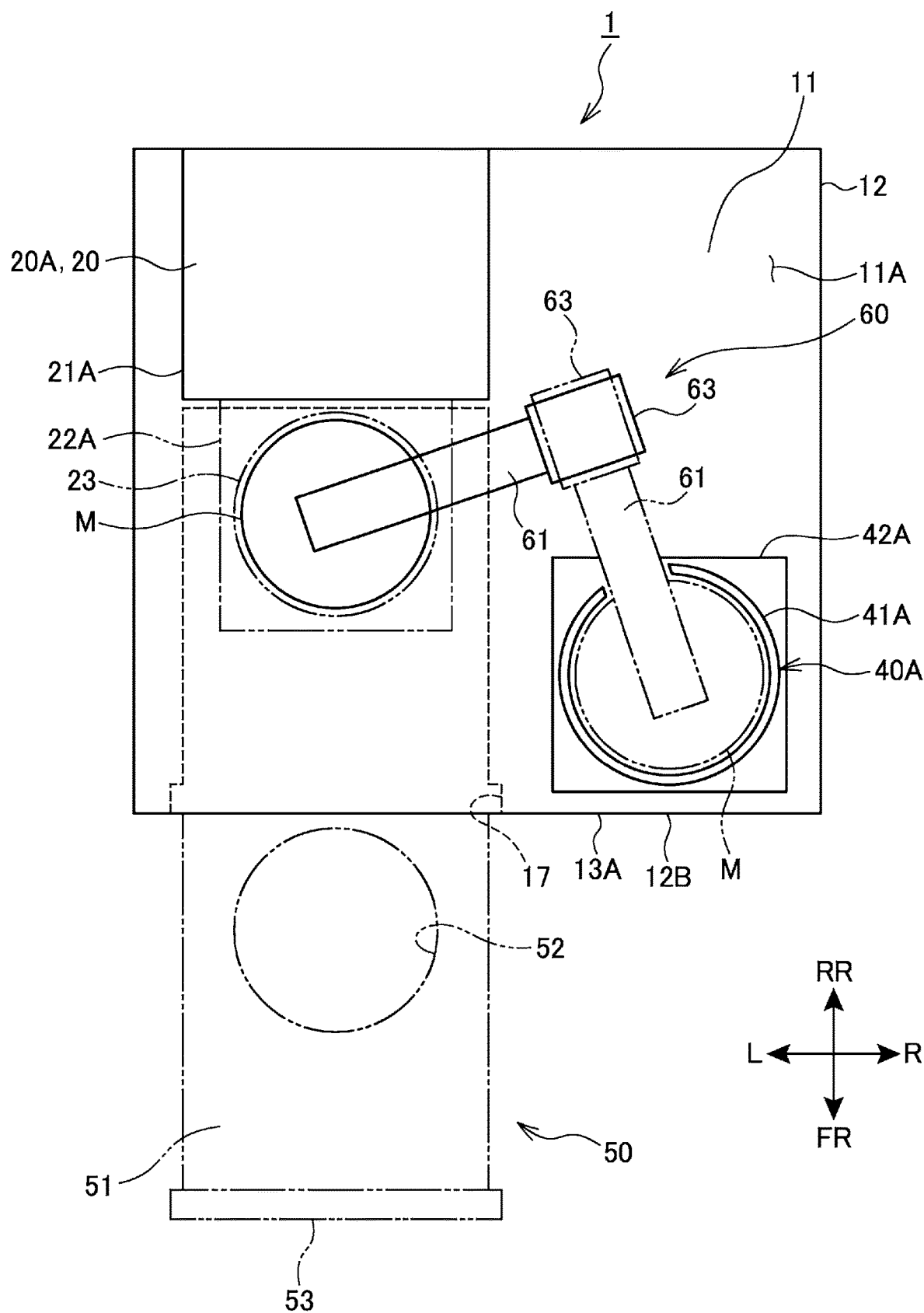
FIG. 3 is a plan view illustrating the interior of the case of the media processing apparatus when viewed from above.

FIG. 2 is a front view illustrating the structure of the media processing apparatus 1. FIG. 3 is a plan view illustrating the interior of the case 10 of the media processing apparatus 1 when viewed from above.

In FIGS. 2 and 3, the right side of the media processing apparatus 1 in a state in which the media processing apparatus 1 is mounted is indicated by the symbol R, the left side is indicated by the symbol L, the upper side is indicated by the symbol UP, the lower side is indicated by the symbol DN, the front is indicated by the symbol FR, and the rear is indicated by the symbol RR.

The interior of the case 10 of the media processing apparatus 1 is vertically separated by a partition 11 as illustrated in FIG. 2. In the description below, a portion, above the partition 11, of the case 10 will be referred to as the upper case denoted by reference numeral 12, and a portion, below the partition 11, of the case 10 will be referred to as the lower case denoted by reference numeral 13.

As illustrated in FIGS. 2 and 3, two medium drives 20, which are a first medium drive 20A and a second medium drive 20B, a label printer 30, a first stacker 40A, a second stacker 40B, and a transport section 60 are provided in the upper case 12. The first medium drive 20A and second medium drive 20B each are an example of a data writing unit. The label printer 30 is an example of a printing unit.

The first medium drive 20A is an apparatus that emits laser light to the recording surface of the medium M to write data. When the first medium drive 20A is intended for, for example, a CD, DVD, or BD, the recoding head of the first medium drive 20A emits laser light with a waveform corresponding to the type of the medium M. As illustrated in FIG. 3, the first medium drive 20A has a medium drive body 21A as well as a drive tray 22A movable in the front-rear direction so as to be inserted into and pulled out of the medium drive body 21A. A recess 23, which is substantially circular, is formed in the upper surface of the drive tray 22A, the medium M being mounted in the recess 23. The drive tray 22A can move in the front-rear direction between a processing position at which the first medium drive 20A writes data to the medium M and a transfer position at which the arm 61 of the transport section 60 passes and receives the medium M. In FIG. 3, the drive tray 22A is positioned at the receiving position with the medium M mounted in the recess 23.

The second medium drive 20B is also an apparatus that emits laser light to the recording surface of the medium M to write data as with the first medium drive 20A. The recording head of the second medium drive 20B emits laser light as with the first medium drive 20A. The second medium drive 20B has a medium drive body 21B as well as a drive tray 22B movable in the front-rear direction so as to be inserted into and pulled out of the medium drive body 21B. A recess, which is substantially circular, is formed in the upper surface of the drive tray 22B as with the drive tray 22A, the medium M being mounted in the recess. The drive tray 22B can move in the front-rear direction between a processing position at which the second medium drive 20B writes data to the medium M and a transfer position at which the arm 61 passes and receives the medium M.

The label printer 30 is a printing apparatus that prints an image on the label surface of the medium M. The label printer 30 has a carriage that reciprocates in the right and left direction, as well as a printing mechanism, such as an ink jet head, mounted in the carriage. The label printer 30 has a printer body 31 as well as a printer tray 32 provided so as to be inserted into and pulled out of the printer body 31. A recess, which is substantially circular, is formed in the upper surface of the printer tray 32 as with the drive trays 22A and 22B, the medium M being mounted in the recess. The printer tray 32 can move in the front-rear direction between a printing position at which the label printer 30 prints an image on the label surface of the medium M and a transfer position at which the arm 61 passes and receives the medium M.

As illustrated in FIG. 2, the first stacker 40A and second stacker 40B are provided in the upper case 12 as storage sections in which the medium M is stored.

The first stacker 40A has a first-stacker storage section 41A, in a cylindrical shape, that can store a stack of, for example, about several tens of media M. In the case 10, the first-stacker storage section 41A is detachably supported to a first stacker base 42A fixed to the case 10. A notch 43A, which is cut so as to be elongated downward, is formed in part of the outer wall of the first-stacker storage section 41A.

This notch 43A enables the arm 61 of the transport section 60 to move to the bottom of the first-stacker storage section 41A.

The second stacker 40B has a second-stacker storage section 41B, in a cylindrical shape, that can store a stack of, for example, about several tens of media M. In the case 10, the second-stacker storage section 41B is detachably supported to a second stacker base 42B fixed to the case 10. Specifically, the second-stacker storage section 41B is detachably supported to the second stacker base 42B with a clearance K left between the upper end of the second-stacker storage section 41B and the lower surface of the first stacker base 42A below the first stacker 40A: the arm 61 of the transport section 60 can be inserted into the clearance K. A notch 43B, which is cut so as to be elongated downward, is formed in part of the outer wall of the second-stacker storage section 41B. This notch 43B enables the arm 61 of the transport section 60 to move to the bottom of the second-stacker storage section 41B.

As described above, the transport section 60 is disposed in the upper case 12 as illustrated in FIGS. 2 and 3. The transport section 60 transports the medium M among the first stacker 40A, the second stacker 40B, a third stacker 50, which will be described later, the first medium drive 20A, the second medium drive 20B, and the label printer 30.

In addition to the arm 61, the transport section 60 has a guide 62 that supports the arm 61. The guide 62 is disposed behind the first stacker 40A and second stacker 40B and to the right of the first medium drive 20A, second medium drive 20B, and label printer 30. The guide 62 is formed like an elongated bar and is erected on the upper surface 11A of the partition 11. The arm 61 moves vertically along the axial direction of the guide 62, and is supported by an arm driving section 63 that swings around the shaft of the guide 62. A medium holding section 64 is provided at the end of the arm 61. The medium holding section 64 holds the medium M in such a way that the medium M can be released.

The arm driving section 63 has an arm detection sensor (not illustrated) that detects the vertical position of the arm driving section 63 on the guide 62 and the swing position of the arm driving section 63 around the shaft of the guide 62. A medium-processing-apparatus control section 100, which will be described later, can detect the position of the medium M held by the medium holding section 64, according to the position of the arm driving section 63 on the guide 62, the position being detected by the arm detection sensor.

The upper case 12 has space, in which the transport section 60 vertically transports the medium M, to the left of the first stacker 40A and second stacker 40B and in front of the first medium drive 20A, second medium drive 20B, and label printer 30. A third stacker 50 is provided at the bottom of the space.

As illustrated in FIG. 2, an opening 14 is formed in the front surface 12B of the upper case 12. A door 15 is provided in front of the opening 14. The door 15 is swingably supported by a door shaft 16 provided at the right end 14A of the opening 14. When the media processing apparatus 1 detects that the door 15 for the opening 14 is closed, the first medium drive 20A, second medium drive 20B, label printer 30, and transport section 60 are operable. By contrast, when the media processing apparatus 1 detects that the door 15 for the opening 14 is open, the media processing apparatus 1 stops the operations of the first medium drive 20A, second medium drive 20B, label printer 30, and transport section 60.

As illustrated in FIGS. 2 and 3, the third stacker 50, which is a storage section that stores the medium M, is disposed in the lower case 13 so as to be able to be pulled out of a pullout opening 17 formed in the front surface 13A of the lower case 13. The third stacker 50 is structured so that even while the door 15 is closed, the user can pull out the third stacker 50 from the pullout opening 17 and can take the processed medium M out of the media processing apparatus 1. The processed medium M refers to the medium M with data written to the recording surface and with printing terminated on the label surface. That is, even in a state in which the first medium drive 20A, second medium drive 20B, label printer 30, or transport section 60 is operating, the user can pull out the third stacker 50 from the pullout opening 17 and can take the processed medium M out of the media processing apparatus 1.

The third stacker 50 is disposed below the first medium drive 20A, second medium drive 20B, and label printer 30 so as to be aligned with them. The third stacker 50 has a third-stacker storage section 51 that can be pulled out toward the front of the case 10 through the pullout opening 17 formed in the front surface 13A of the lower case 13. The third-stacker storage section 51 has a recess 52, which is substantially circular, in which media M are stacked. Several media M can be stored in the recess 52. A grip 54 is formed on the front surface 53 of the third stacker 50 as illustrated in FIG. 2. The user can hold the grip 54 to pull out the third-stacker storage section 51 from the case 10 toward the front.

The third stacker 50 is structured so that an additional stacker 57 can be attached, as indicated by the dash-dot-dot lines in FIG. 2. The additional stacker 57 is formed in a cylindrical shape having a bottom so that a stack of media M can be stored. When the additional stacker 57 is attached to the third stacker 50, the number of media M that can be stored in the third stacker 50 can be increased from several media M to several tens of media M.

Next, the functional structures of the media processing apparatus 1 and control apparatus 2 will be described.

Figure 4:
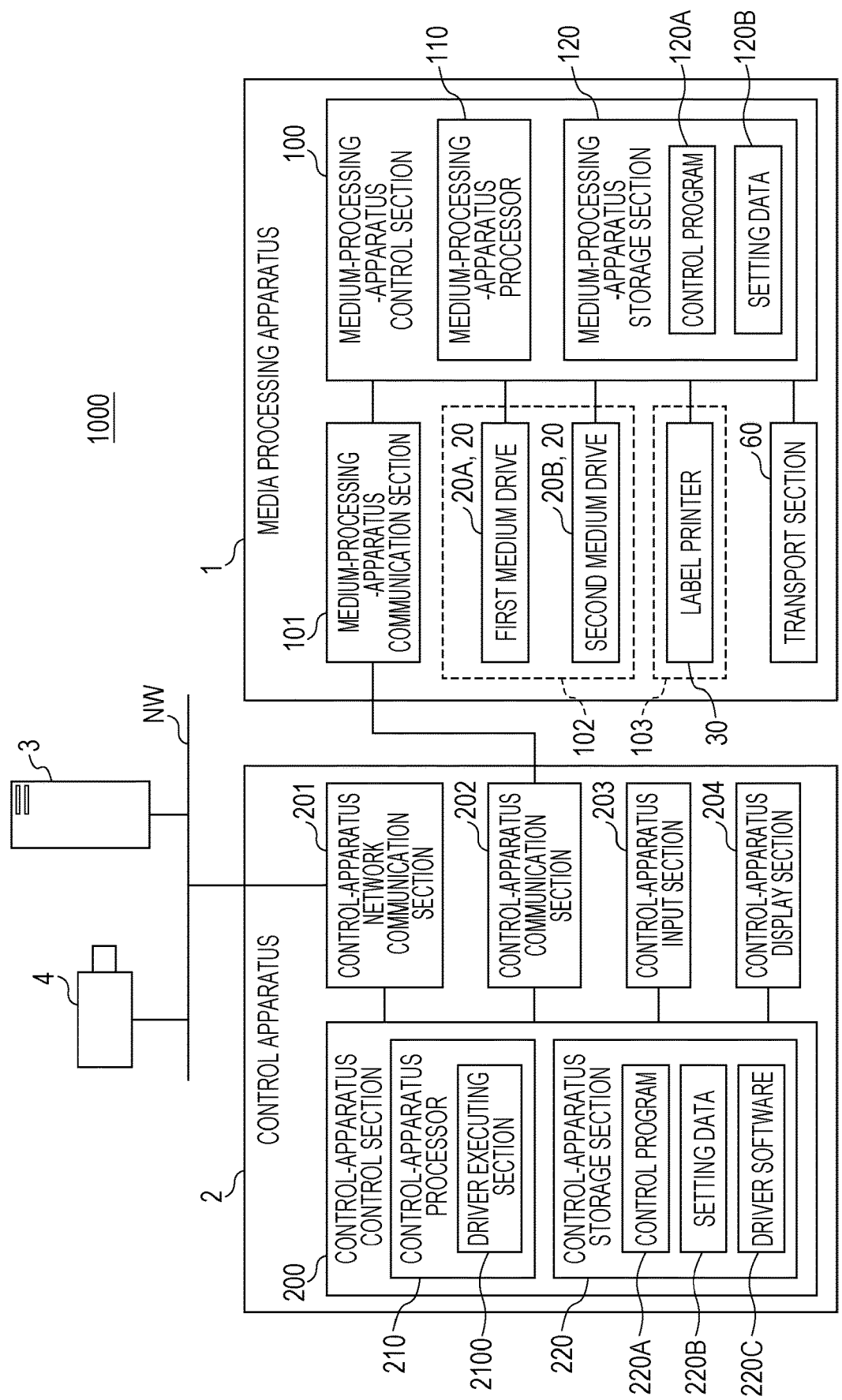
FIG. 4 is a block diagram illustrating the functional structures of the media processing apparatus and a control apparatus.

FIG. 4 is a block diagram illustrating the functional structures of the media processing apparatus 1 and control apparatus 2.

The media processing apparatus 1 has a medium-processing-apparatus control section 100, a medium-processing-apparatus communication section 101, a writing section 102, a printing section 103, and the transport section 60.

The medium-processing-apparatus control section 100 is an example of a control section. The medium-processing-apparatus communication section 101 is an example of a receiving section.

The medium-processing-apparatus control section 100 has a medium-processing-apparatus processor 110, such as a central processing unit (CPU) or microprocessing unit (MPU), that executes programs, as well as a medium-processing-apparatus storage section 120. The medium-processing-apparatus control section 100 controls individual sections in the media processing apparatus 1. The medium-processing-apparatus control section 100 executes various types of processing by cooperation between hardware and software so that the medium-processing-apparatus processor 110 reads out a control program 120A stored in the medium-processing-apparatus storage section 120 and executes processing.

The medium-processing-apparatus storage section 120 is an example of a storage section.

The medium-processing-apparatus storage section 120 has a storage area in which programs to be executed by the medium-processing-apparatus processor 110 and data to be processed by the medium-processing-apparatus processor 110 are stored. The medium-processing-apparatus storage section 120 stores the control program 120A to be executed by the medium-processing-apparatus processor 110 and setting data 120B including various settings related to the operation of the media processing apparatus 1. The medium-processing-apparatus storage section 120 has a non-volatile storage area in which programs and data are stored in a non-volatile manner. The medium-processing-apparatus storage section 120 may also include a volatile storage area to have a work area in which programs to be executed by the medium-processing-apparatus processor 110 and data to be processed are temporarily stored.

The medium-processing-apparatus communication section 101 is structured by using communication hardware complying with a predetermined communication standard. The medium-processing-apparatus communication section 101 communicates with the control apparatus 2 under control of the medium-processing-apparatus control section 100. Examples of communication hardware include a communication circuit, communication ports, a communication circuit board, communication connectors, and other hardware. The communication standard used between the medium-processing-apparatus communication section 101 and the control apparatus 2 may be a wired communication standard or may be a wireless communication standard.

The writing section 102 is a functional section that writes data to the recording surface of the medium M. The writing section 102 has the first medium drive 20A and second medium drive 20B. The writing section 102 uses any one of the first medium drive 20A and second medium drive 20B to write data to one medium M under control of the medium-processing-apparatus control section 100.

The printing section 103 is a functional section that prints an image on the label surface of the medium M. The printing section 103 has the label printer 30, an ink supply section that supplies ink to the label printer 30, and other structural elements involved in printing. The printing section 103 prints an image on the label surface of the medium M under control of the medium-processing-apparatus control section 100.

The transport section 60 has the arm 61, the guide 62, the arm driving section 63, the medium holding section 64, a driving section that drives the medium holding section 64, and other structural elements involved in the transport of the medium M. The transport section 60 transports the medium M in the media processing apparatus 1 under control of the medium-processing-apparatus control section 100.

The control apparatus 2 has a control-apparatus control section 200, a control-apparatus network communication section 201, a control-apparatus communication section 202, a control-apparatus input section 203, and a control-apparatus display section 204.

The control-apparatus control section 200 has a control-apparatus processor 210, such as a CPU or an MPU, that executes programs, as well as a control-apparatus storage section 220. The control-apparatus control section 200 controls individual sections in the control apparatus 2. The control-apparatus control section 200 executes various types of processing by cooperation between hardware and software so that the control-apparatus processor 210 reads out a control program 220A, driver software 220C, or the like stored in the control-apparatus storage section 220 and executes processing.

The driver software 220C is installed in the control apparatus 2. When the control-apparatus processor 210 reads out the driver software 220C and executes it, the control-apparatus control section 200 functions as a driver executing section 2100, which will be described later.

The control-apparatus storage section 220 has a storage area in which programs to be executed by the control-apparatus processor 210 and data to be processed by the control-apparatus processor 210 are stored. The control-apparatus storage section 220 stores the control program 220A to be executed by the control-apparatus processor 210, setting data 220B including various settings related to the operation of the control apparatus 2, the driver software 220C, and various other types of data. The control-apparatus storage section 220 has a non-volatile storage area in which programs and data are stored in a non-volatile manner. The control-apparatus storage section 220 may also include a volatile storage area to have a work area in which programs to be executed by the control-apparatus processor 210 and data to be processed are temporarily stored.

The control-apparatus network communication section 201 has communication hardware complying with a predetermined communication standard. Under control of the control-apparatus control section 200, the control-apparatus network communication section 201 communicates with the file storage apparatus 3 connected to the network NW in compliance with the predetermined communication standard.

The control-apparatus communication section 202 has communication hardware complying with the predetermined communication standard. Under control of the control-apparatus control section 200, the control-apparatus communication section 202 communicates with the media processing apparatus 1.

The control-apparatus input section 203 has manipulation switches provided on the control apparatus 2 and input units, such as a keyboard and a touch panel, coupled to the control apparatus 2. The control-apparatus input section 203 detects a manipulation performed on an input unit by the user that manipulates the control apparatus 2, and sends an output to the control-apparatus control section 200. The control-apparatus control section 200 receives the output from the control-apparatus input section 203, and executes processing corresponding to the manipulation on the input unit according to the received output.

The control-apparatus display section 204 has a display panel such as a liquid crystal display panel. The control-apparatus display section 204 displays various types of information under control of the control-apparatus control section 200.

The driver executing section 2100 acquires a photographic data file from the file storage apparatus 3, and sends the acquired photographic data file to the media processing apparatus 1 as write data, which is data to be written to the recoding surface of the medium M.

The driver executing section 2100 acquires a photographic data file of photographic data that was output from the camera 4 to the file storage apparatus 3 for the first time after the camera 4 started photography. The driver executing section 2100 then sends the acquired photographic data file and a medium create command to the media processing apparatus 1 through the control-apparatus communication section 202.

The medium create command commands media creation on the medium M in compliance with the command system of the media processing apparatus 1. The medium create command includes creation count information that indicates the number of media M on which to perform media creation. In this embodiment, the medium create command includes creation count information that indicates more media M on which to perform media creation than there are medium drives 20 included in the media processing apparatus 1.

Upon receipt of the medium create command, the media processing apparatus 1 starts media creation on as many media M as indicated by the creation count information included in the medium create command.

In this embodiment, the driver executing section 2100 sends the medium create command to the media processing apparatus 1 together with the photographic data file of the photographic data that was output from the camera 4 to the file storage apparatus 3 for the first time after the camera 4 started photography. However, the driver executing section 2100 may send the medium create command to the media processing apparatus 1 before sending the photographic data file.

The driver executing section 2100 acquires, from the file storage apparatus 3, a photographic data file of photographic data output from the camera 4 each time the camera 4 intermittently outputs photographic data to the file storage apparatus 3, starting from the first photographic data, which is output to the file storage apparatus 3 for the first time after the camera 4 started photography. Then, the driver executing section 2100 sends the acquired photographic data file to the media processing apparatus 1 as write data.

When a predetermined trigger occurs, the driver executing section 2100 sends a medium close command to the media processing apparatus 1 through the control-apparatus communication section 202. The medium close command commands close processing by which the medium M is closed so that additional data is not written. The medium close command complies with the command system of the media processing apparatus 1.

When the number of photographic data files sent to the media processing apparatus 1 reaches a predetermined number, the driver executing section 2100 sends the medium close command to the media processing apparatus 1.

When the sum of the amount of data in the photographic data file acquired last from the file storage apparatus 3 and the total amount of data in photographic data files sent to the media processing apparatus 1 until the last acquisition exceeds a predetermined threshold value, the driver executing section 2100 also sends the medium close command to the media processing apparatus 1.

This predetermined threshold value, which is lower than the maximum amount of data that can be written to one medium M, is determined in advance through, for example, a preliminary test or simulation. The predetermined threshold value varies depending on the type of medium M on which the media processing apparatus 1 performs media creation. When the medium M on which the media processing apparatus 1 performs media creation is a CD, the predetermined threshold value is a value indicating, for example, 600 megabytes (MB). When the medium M on which the media processing apparatus 1 performs media creation is a DVD, the predetermined threshold value is a value indicating, for example, 4 gigabytes (GB). When the medium M on which the media processing apparatus 1 performs media creation is a BD, the predetermined threshold value is a value indicating, for example, 23 GB.

When a close file is stored in the file storage apparatus 3 and the driver executing section 2100 acquires the close file from the file storage apparatus 3, the driver executing section 2100 sends a medium close command to the media processing apparatus 1 through the control-apparatus communication section 202. The close file indicates termination of photography by the camera 4. When the camera 4 starts photography, the file storage apparatus 3 creates a folder in which to store photographic data files. Each time the camera 4 outputs photographic data, the file storage apparatus 3 stores a photographic data file in the created folder. When the camera 4 terminates photography, the file storage apparatus 3 stores a close file in the created folder.

Next, the operation of the media processing apparatus 1 will be described by using an example in which the media processing apparatus 1 including two medium drives 20 performs media creation on three media M.

Figure 5:
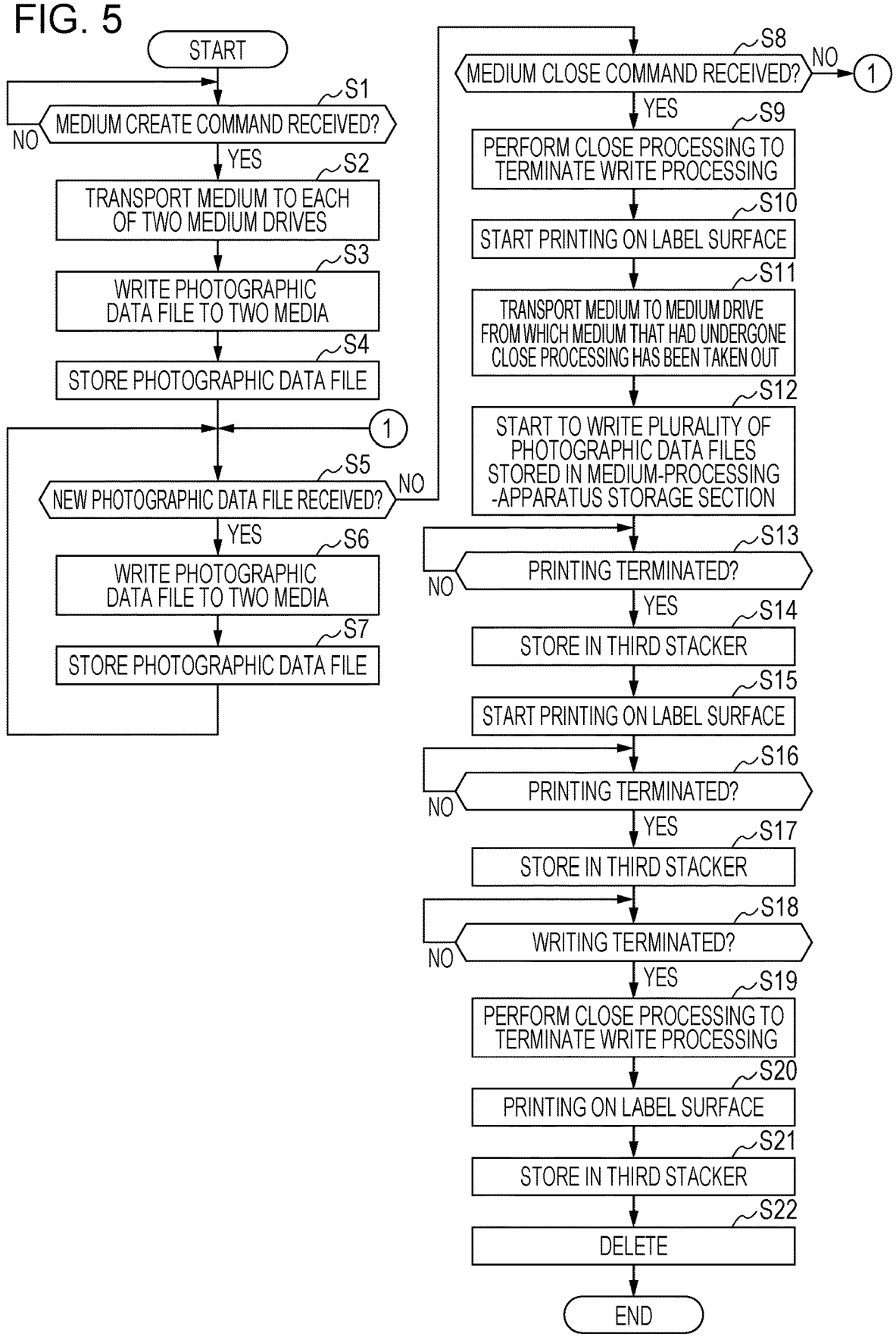
FIG. 5 is a flowchart indicating the operation of the media processing apparatus.

FIG. 5 is a flowchart indicating the operation of the media processing apparatus 1.

In the operation, indicated in FIG. 5, of the media processing apparatus 1, media creation is performed on three media M by using the two medium drives 20 included in the media processing apparatus 1.

The medium-processing-apparatus control section 100 in the media processing apparatus 1 decides whether the medium-processing-apparatus communication section 101 has received a medium create command from the control apparatus (step S1). This medium create command includes creation count information indicating three media M.

When the medium-processing-apparatus control section 100 decides that a medium create command has not been received (No in step S1), the medium-processing-apparatus control section 100 makes a decision again in step S1.

When the medium-processing-apparatus control section 100 decides that a medium create command has been received (Yes in step S1), the medium-processing-apparatus control section 100 causes the transport section 60 to transport one medium M for which no data is written to the recording surface and printing is not performed on the label surface to each of the first medium drive 20A and second medium drive 20B (step S2).

Next, the medium-processing-apparatus control section 100 causes the first medium drive 20A and second medium drive 20B to write received photographic data file to the two media M (step S3). The photographic data file written in step S3 is the photographic data file of the photographic data that was output from the camera 4 to the file storage apparatus 3 for the first time after the camera 4 started photography.

Next, the medium-processing-apparatus control section 100 stores, in the medium-processing-apparatus storage section 120, the photographic data file written to the media M in step S3 (step S4). The medium-processing-apparatus control section 100 prohibits editing for the photographic data files stored in the medium-processing-apparatus storage section 120. Therefore, even when the user manipulates the control apparatus 2, media processing apparatus 1, or the like, the user cannot edit the photographic data file stored in the medium-processing-apparatus storage section 120.

Next, the medium-processing-apparatus control section 100 decides whether the medium-processing-apparatus communication section 101 has received a new photographic data file from the control apparatus 2 (step S5).

When the medium-processing-apparatus control section 100 decides that a new photographic data file has been received from the control apparatus 2 (Yes in step S5), the medium-processing-apparatus control section 100 causes the first medium drive 20A and second medium drive 20B to write the received new photographic data file to the two media M (step S6). In step S6, the medium-processing-apparatus control section 100 causes the new photographic data file to be added to the already-written photographic data files.

Next, the medium-processing-apparatus control section 100 stores the photographic data file, which was written to each of the two media M in step S6, in the medium-processing-apparatus storage section 120 (step S7). In step S7, the medium-processing-apparatus control section 100 stores the photographic data file in the medium-processing-apparatus storage section 120 so that a plurality of photographic data files stored in the medium-processing-apparatus storage section 120 are arranged in the order in which they were written to the media M. Alternatively, the medium-processing-apparatus control section 100 stores a plurality of photographic data files in the medium-processing-apparatus storage section 120 together with the order in which they were written. As described above, the medium-processing-apparatus control section 100 prohibits editing for the photographic data files stored in the medium-processing-apparatus storage section 120.

Upon the termination of processing in step S7, the medium-processing-apparatus control section 100 executes processing in steps S5 and S6 again. That is, each time the medium-processing-apparatus control section 100 receives a new photographic data file from the control apparatus 2, the medium-processing-apparatus control section 100 causes each of the first medium drive 20A and second medium drive 20B to add the new photographic data file to the relevant medium, which is one of the two media M. Upon the termination of writing, the medium-processing-apparatus control section 100 stores the written photographic data file so that a plurality of photographic data files in the medium-processing-apparatus storage section 120 are arranged in the order in which they were written. Alternatively, the medium-processing-apparatus control section 100 stores a plurality of photographic data files in the medium-processing-apparatus storage section 120 together with the order in which they were written.

Step S5 will be described again. When the medium-processing-apparatus control section 100 decides that a new photographic data file has not been received from the control apparatus 2 (No in step S5), the medium-processing-apparatus control section 100 decides whether the medium-processing-apparatus communication section 101 has received a medium close command from the control apparatus 2 (step S8).

When the medium-processing-apparatus control section 100 decides that a medium close command has not been received from the control apparatus 2 (No in step S8), the medium-processing-apparatus control section 100 returns processing to step S5.

When the medium-processing-apparatus control section 100 decides that a medium close command has been received from the control apparatus 2 (Yes in step S8), the medium-processing-apparatus control section 100 causes the first medium drive 20A and second medium drive 20B to perform close processing on the two media M in response to the received medium close command to terminate writing by the medium drives 20 (step S9).

Next, the medium-processing-apparatus control section 100 causes the transport section 60 to transport, to the label printer 30, one of the two media M that have undergone close processing, and causes the label printer 30 to start printing on the label surface of the one medium M (step S10).

Next, the medium-processing-apparatus control section 100 causes the transport section 60 to transport one medium M to which data has yet to be written and for which printing has yet to be performed on the label surface, from the first stacker 40A and/or second stacker 40B to the medium drive 20 from which the medium M that had undergone close processing has been taken out (step S11).

The medium-processing-apparatus control section 100 then starts to write a plurality of photographic data files stored in the medium-processing-apparatus storage section 120 to the medium M transported in step S11 (step S12). In step S12, the medium-processing-apparatus control section 100 writes the plurality of photographic data files to the third medium M in the same order as the order in which photographic data files were written to the first and second media M.

The medium-processing-apparatus control section 100 decides whether printing started in step S10 has been terminated (step S13).

When the medium-processing-apparatus control section 100 decides that printing started in step S10 has been terminated (Yes in step S13), the medium-processing-apparatus control section 100 causes the transport section 60 to store the medium M on which printing has been terminated in the third stacker 50 (step S14). This completes media creation on the first medium M.

Next, the medium-processing-apparatus control section 100 causes the transport section 60 to transport, to the label printer 30, the remaining one medium M of the two media M that have undergone close processing, and causes the label printer 30 to start printing on the label surface of the one medium M (step S15).

The medium-processing-apparatus control section 100 decides whether printing started in step S15 has been terminated (step S16).

When the medium-processing-apparatus control section 100 decides that printing started in step S16 has been terminated (Yes in step S16), the medium-processing-apparatus control section 100 causes the transport section 60 to store the medium M on which printing has been terminated in the third stacker 50 (step S17). This completes media creation on the second medium M.

Next, the medium-processing-apparatus control section 100 decides whether writing started in step S12 has been terminated (step S18).

When the medium-processing-apparatus control section 100 decides that writing started in step S12 has been terminated (Yes in step S18), the medium-processing-apparatus control section 100 performs close processing to terminate writing by the medium drive 20 (step S19). In this case, the medium-processing-apparatus control section 100 performs close processing without receiving a media close command as a trigger. This is because in media creation on the third medium M, all photographic data files to be written to the medium M have already been received by the media processing apparatus 1.

Next, the medium-processing-apparatus control section 100 causes the transport section 60 to transport, to the label printer 30, the medium M that has undergone close processing, and causes the label printer 30 to print an image on the label surface of the medium M (step S20). Image data of the image on the label surface may be received together with a media create command or may be received while write processing is in progress.

When printing by the label printer 30 is terminated, the medium-processing-apparatus control section 100 causes the transport section 60 to store the processed medium M in the third stacker 50 (step S21). This completes media creation on the third medium M.

Next, the medium-processing-apparatus control section 100 deletes the plurality of photographic data files stored in the medium-processing-apparatus storage section 120 (step S22).

Processing timings taken by the media processing apparatus 1 to perform media creation on three media M will be described with reference to FIG. 6.

Figure 6:
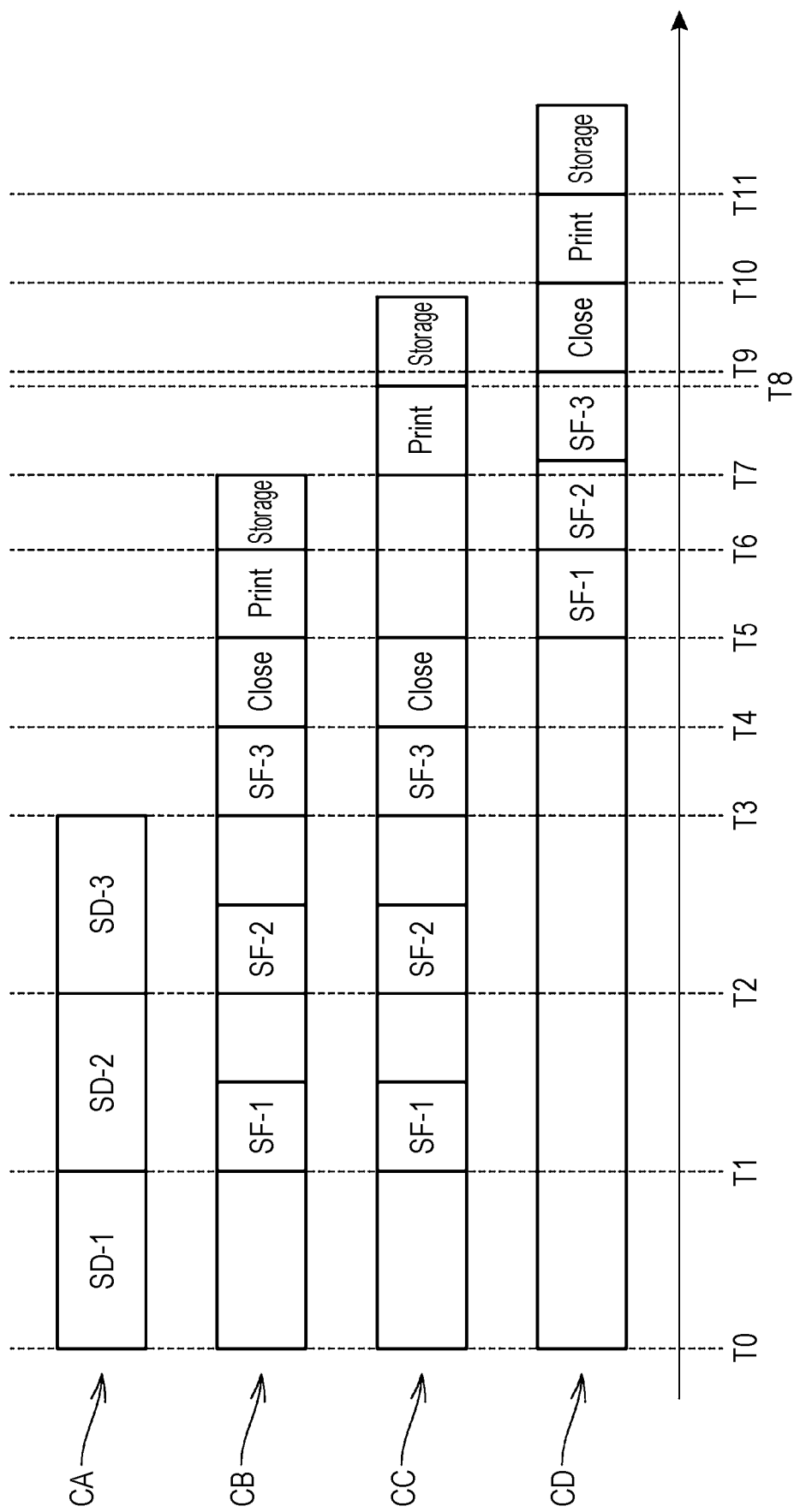
FIG. 6 is a timing diagram of processing timings in media creation on three media.

FIG. 6 is a timing diagram of processing timings in media creation on three media M by two medium drives 20.

In the description below with reference to FIG. 6, as an example, the media processing system 1000 will be applied to a court of law, the camera 4 will be mounted in a courtroom, and the camera 4 will photograph the interior of the courtroom in which a judgment is in progress. In the description with reference to FIG. 6, as an example, the judgment will be performed in the courtroom for 45 minutes and that the camera 4 will output one photographic data item to the file storage apparatus 3 at 15-minute intervals. In the description with reference to FIG. 6, as an example, to pass media M to which photographic data for 45 minutes is written to three persons, plaintiff, defendant and judge, the media processing apparatus 1 having two medium drives 20 will perform media creation on three media M.

In FIG. 6, the chart CA indicates the operation of the camera 4. In the chart CA, a block assigned the characters SD-1 indicates that photographic data is created that will be output for the first time among three photographic data items to be output from the camera 4 to the file storage apparatus 3. In the chart CA, a block assigned the characters SD-2 indicates that photographic data is created that will be output for the second time among the three photographic data items to be output from the camera 4 to the file storage apparatus 3. In the chart CA, a block assigned the characters SD-3 indicates that photographic data is created that will be output for the third time among the three photographic data items to be output from the camera 4 to the file storage apparatus 3.

In FIG. 6, the chart CB indicates processing on the first medium M; the chart CC indicates processing on the second medium M; and the chart CD indicates processing on the third medium M. In the charts CB, CC, and CD, the block assigned the characters SF-1 indicates that a photographic data file of photographic data output for the first time after the camera 4 started photography is written; the block assigned the characters SF-2 indicates that a photographic data file of photographic data output for the second time after the camera 4 started photography is written; and the block assigned the characters SF-3 indicates that a photographic data file of photographic data output for the third time after the camera 4 started photography is written. The block assigned the characters Close indicates close processing by the medium drive 20. The block assigned the characters Print indicates that the label printer 30 performs printing on the label surface. The block assigned the characters Storage indicates storage in the third stacker 50. The block to which no character is assigned indicates that processing is not performed.

When a judgment starts in the courtroom, the camera 4 starts photography. The camera 4 then starts creation of photographic data to be output to the file storage apparatus 3 at time T0 and later.

When the camera 4 outputs photographic data for the first time at time T1, the media processing apparatus 1 starts to receive a photographic data file of the photographic data, which was output from the camera 4 to the file storage apparatus 3 for the first time, at time T1. At time T1 and later, the media processing apparatus 1 writes the photographic data file received from the control apparatus 2 to two media M, as indicated in the charts CB and CC.

The camera 4 continues to create photographic data at time T1 and later. When the camera 4 outputs photographic data for the second time at time T2, the media processing apparatus 1 starts to receive a photographic data file of the photographic data, which was output from the camera 4 for the second time, at time T2. At time T2 and later, the media processing apparatus 1 writes the photographic data file received from the control apparatus 2 to the two media M, as indicated in the charts CB and CC.

The camera 4 continues to create photographic data at time T2 and later. When the judgment is terminated and the camera 4 terminates photography at time T3, the camera 4 outputs photographic data for the third time. At time T3, the media processing apparatus 1 starts to receive a photographic data file of the photographic data, which was output from the camera 4 for the third time. At time T3 and later, the media processing apparatus 1 writes the photographic data file received from the control apparatus 2 to the two media M, as indicated in the charts CB and CC.

When the media processing apparatus 1 receives a media close command from the control apparatus 2 in a period between times T3 and T4, the media processing apparatus 1 performs close processing on the two media M.

When the media processing apparatus 1 terminates close processing at time T5, the media processing apparatus 1 performs printing on the label surface of one of the two media M at time T5 and later. At time T5 and later, the media processing apparatus 1 transports a third medium M to the medium drive 20 from which the medium M was taken out and writes the three photographic data files stored in the medium-processing-apparatus storage section 120, as indicated in the chart CD.

When printing is terminated on the label surface at time T6, the media processing apparatus 1 stores the medium M on which printing was terminated in the third stacker 50, as indicated in the chart CB. This completes the media creation on the first medium M.

When the storage of the medium M on which printing was performed is terminated at time T7, the media processing apparatus 1 transports the second medium M, on which writing was terminated, to the label printer 30 and performs printing on the label surface at time T7 and later, as indicated in the chart CC.

When printing is terminated on the label surface at time T8, the media processing apparatus 1 stores the medium M on which printing was terminated in the third stacker 50, as indicated in the chart CC. This completes the media creation on the second medium M.

When writing to the third medium M is terminated at time T9, the media processing apparatus 1 performs close processing on the third medium M at time T9 and later, as indicated in the chart CD.

When close processing is terminated at time T10, the media processing apparatus 1 performs printing on the label surface of the third medium M, which has undergone the close processing at time T10 and later, as indicated in the chart CD.

When printing is terminated on the label surface of the third medium M at time T11, the media processing apparatus 1 stores the third medium M in the third stacker 50, as indicated in the chart CD. This completes the media creation on the third medium M.

As described above, when the media processing apparatus 1 performs media creation on the first and second media M, the media processing apparatus 1 causes the medium drive 20 to write a photographic data file at the time when the media processing apparatus 1 receives the photographic data file from the control apparatus 2. This enables quick media creation on the first and second media M when compared with a case in which all photographic data files of a judgment need to be acquired before they are written to the first and second media M. Since media creation on the first and second media M can be quickly performed, media creation on the third medium M can be quickly started. In writing to the third medium M, a plurality of photographic data files stored in the medium-processing-apparatus storage section 120 are written, eliminating the need to receive them from the control apparatus 2 again. This enables writing to the third medium M to be quickly started. Therefore, the media processing apparatus 1 can shorten the time taken to pass media M to the plaintiff, defendant, and judge. That is, upon the termination of the judgment, the media processing apparatus 1 can quickly perform media creation on media M, that is, media M that will be passed to the plaintiff, defendant, and judge and to which all photographic data for the judgment has been written.

The medium-processing-apparatus control section 100 prohibits editing for a plurality of photographic data files stored in the medium-processing-apparatus storage section 120. Therefore, a plurality of photographic data files to be written to the third medium M are not altered, for example. This enables the media processing apparatus 1 to assure that the same photographic data files are written to all media M to be passed to the plaintiff, defendant, and judge.

After media creation on the third medium M has been terminated, the media processing apparatus 1 deletes the plurality of photographic data files from the medium-processing-apparatus storage section 120. This can prevent a photographic data file of another judgment from entering one medium M to be passed to any of the plaintiff, defendant, and judge.

In the operation described above, an example has been taken in which media creation is performed on three media M with two medium drives 20 included in the media processing apparatus 1. In media creation on four media M, the media processing apparatus 1 operates as described below.

When processing in step S17 in FIG. 5 is executed, the medium-processing-apparatus control section 100 causes the transport section 60 to transport one medium M to which data has yet to be written and for which printing has yet to be performed on the label surface, from the first stacker 40A and/or second stacker 40B to the medium drive 20 from which the medium M that had undergone close processing has been taken out. The medium-processing-apparatus control section 100 then starts to write a plurality of photographic data files stored in the medium-processing-apparatus storage section 120 to the transported medium M. After this, the medium-processing-apparatus control section 100 executes processing in steps S18 to S21 on the third and fourth media M, to which data has been written by the second medium drive 20. Upon the termination of media creation on the fourth medium M, the medium-processing-apparatus control section 100 executes processing in step S22.

Although, in the operation described above, the media processing apparatus 1 has two medium drives 20, the media processing apparatus 1 may have N medium drives 20 (N is an integer equal to or greater than 2). When the media processing apparatus 1 performs media creation on K media M (K is greater than N and at most 2N) with N medium drives 20, the media processing apparatus 1 executes the operation described above.

The embodiment described above has effects described below. A first photographic data file and a second photographic data file in the description of effects do not refer to particular photographic data files. The first photographic data file refers to a certain photographic data file, and the second photographic data file refers to a photographic data file sent from the control apparatus 2 after the certain photographic data file has been sent.

A media processing apparatus 1 has N medium drives 20 (N is an integer equal to or greater than 2), a label printer 30 that performs printing on the label surface of a medium M, a medium-processing-apparatus control section 100 that controls the N medium drives 20 and label printer 30, a medium-processing-apparatus communication section 101 that receives, from a control apparatus 2, a first photographic data file, a second photographic data file, and creation count information indicating the number K of media M on which to perform media creation (K is an integer not greater than 2N), and a medium-processing-apparatus storage section 120 that stores the first photographic data file and second photographic data file received by the medium-processing-apparatus communication section 101. When K indicated by the creation count information received by the medium-processing-apparatus communication section 101 is greater than N, after the medium-processing-apparatus communication section 101 receives the first photographic data file and second photographic data file, the medium-processing-apparatus control section 100 causes the N medium drives 20 to write the first photographic data file and second photographic data file to N media M. After writing has been terminated, the medium-processing-apparatus control section 100 causes the label printer 30 to perform printing on the label surfaces of the N media M in succession. After a first medium drive 20A of the N medium drives 20 has terminated writing to one medium M, under control of the medium-processing-apparatus control section 100, the first medium drive 20A writes the first photographic data file and second photographic data file stored in the medium-processing-apparatus storage section 120 to one of (K−N) media M.

Since photographic data files that are intermittently sent from the control apparatus 2 are written to media M at the time when they are received, media creation can be quickly performed on the N media M when compared with a case in which a plurality of photographic data files need to be acquired before they are written to media M. Therefore, media creation on the (K−N) media M can be quickly started. In writing to the (K−N) media M, a plurality of photographic data files stored in the medium-processing-apparatus storage section 120 are written, eliminating the need to receive them from the control apparatus 2 again. This enables writing to the (K−N) media M to be quickly started. When photographic data files are intermittently sent from the control apparatus 2, therefore, it is possible to shorten the time taken to perform media creation on more media M than there are medium drives 20.

While printing on the label surfaces of the N media M is in progress, the medium-processing-apparatus control section 100 causes the medium drives 20 to start writing to the (K−N) media M.

Since writing to the (K−N) media M can be started concurrently with printing on the label surfaces of the N media M, it is possible to further shorten the time taken to perform media creation on more media M than there are medium drives 20.

After media creation has been terminated on the (K−N) media M, the medium-processing-apparatus control section 100 deletes the first photographic data file and second photographic data file from the medium-processing-apparatus storage section 120.

This prevents photographic data files used in the previous media creation on (K−N) media M from being used in media creation performed this time on (K−N) media M. Therefore, the media processing apparatus 1 can reliably prepare K media M to which the same photographic data files have been written.

The medium-processing-apparatus control section 100 prohibits editing for the first photographic data file and second photographic data file stored in the medium-processing-apparatus storage section 120.

Since the first photographic data file and second photographic data file stored in the medium-processing-apparatus storage section 120 are not edited before media creation is started on (K−N) media M, therefore, the media processing apparatus 1 can reliably prepare K media M to which the same photographic data files have been written.

When the medium-processing-apparatus communication section 101 receives a media close command from the control apparatus 2, the medium-processing-apparatus control section 100 terminates writing to the N media M.

Even when photographic data files are intermittently sent from the control apparatus 2, therefore, the time at which to shift to printing on the label surface can be determined by receiving a media close command. Accordingly, the media processing apparatus 1 can terminate write processing by the medium drives 20 and can shift to printing on the label surface. Even when photographic data files are intermittently sent from the control apparatus 2, therefore, the media processing apparatus 1 can perform media creation on N media M. This enables the media processing apparatus 1 to reliably shift processing to media creation on (K−N) media M. Even when photographic data files are intermittently sent from the control apparatus 2, therefore, the media processing apparatus 1 can reliably perform media creation on more media M than there are medium drives 20.

In a method of controlling the media processing apparatus 1, when K indicated by the creation count information received by the medium-processing-apparatus communication section 101 is greater than N, a first photographic data file is stored; the first photographic data file is written to N media M by the medium drives 20; after the first photographic data file has been received, a second photographic data file is received; the second photographic data file is stored; and the second photographic data file is added to the N media M by the medium drives 20. In the method of controlling the media processing apparatus 1, after the first photographic data file and second photographic data file have been written, printing is performed on the label surfaces of the N media M by the label printer 30. In the method of controlling the media processing apparatus 1, after writing to the N media M by the medium drives 20 has been terminated, the stored first photographic data file and second photographic data file are written to (K−N) media M by the medium drives 20.

Thus, effects similar to the effects of the media processing apparatus 1 are obtained.

The embodiment described above just indicates one aspect of the present disclosure. The embodiment can be arbitrarily modified and applied without departing from the intended scope of the present disclosure.

For example, in the above embodiment, the control apparatus 2 has sent a photographic data file as write data. However, write data to be sent by the control apparatus 2 may not be in a file format. Furthermore, write data to be sent by the control apparatus 2 is not limited to a file of photographic data captured by the camera 4. For example, write data may be a file of other data such as voice data. In this case, the control apparatus 2 acquires a file of other data from the file storage apparatus 3, and the media processing system 1000 has an apparatus that intermittently outputs the file of other data to the file storage apparatus 3.

For example, the medium drive 20 included in the media processing apparatus 1 is not limited to write processing as processing performed on the medium M. The medium drive 20 may be a device that can read out data.

For example, the media processing apparatus 1 in the above embodiment has had one label printer 30. However, the media processing apparatus 1 may have a plurality of label printers 30.

The functions of the medium-processing-apparatus control section 100 and control-apparatus control section 200 may be implemented by a plurality of processors or a semiconductor chip.

The sections illustrated in FIG. 4 are just an example. There is no particular limitation on a specific embodiment. That is, one piece of hardware does not necessarily need to be mounted in correspondence with one section. Of course, one processor may execute programs to implement the functions of individual sections. Part of the functions implemented by software in the above embodiment may be implemented by hardware. Alternatively, part of the functions implemented by hardware may be implemented by software. In addition, specific details of the structures of other sections in the media processing apparatus 1 and control apparatus 2 can also be arbitrarily modified without departing from the intended scope of the present disclosure.

The flowchart in FIG. 5 is divided into operation steps according to, for example, main processing, so as to facilitate the understanding of the operation of each section in the media processing apparatus 1. The present disclosure is not limited by the method of dividing a single piece of processing into steps or by names. The flowchart may be divided into more steps according to the processing. One step may be further divided so as to include more processing. The sequence of steps may be appropriately changed without causing a problem in the intended scope of the present disclosure.

What is claimed is:

1. A media processing apparatus that communicates with a control apparatus, the apparatus comprising:
    N data writing units configured to write data to a medium, N being an integer equal to or greater than 2;
    a printing unit configured to perform printing;
    a controller configured to control the N data writing units and the printing unit;
    a receiving unit configured to receive, from the control apparatus, first write data, second write data sent after the first write data is sent, and creation count information indicating a number K of media on which to perform media creation, K being an integer not greater than 2N;, and
    a storage configured to store the first write data and the second write data that were received by the receiving section; wherein
    when K indicated by the creation count information received by the receiving section is greater than N, the controller
        executes control so that after the receiving section receives the first write data and the second write data, the N data writing units write the first write data and the second write data to the N media, and upon termination of writing, the printing unit performs printing on label surfaces of the N media, and
        executes control so that after one of the N data writing units terminates writing to one medium, the first write data and second write data stored in the storage are written to one of (K−N) media.

2. The media processing apparatus according to claim 1, wherein while printing on the label surfaces of the N media is in progress, the controller starts writing to one of the (K−N) media.

3. The media processing apparatus according to claim 1, wherein after media creation is terminated on the K media, the controller deletes the first write data and the second write data from the storage.

4. The media processing apparatus according to claim 1, wherein the controller prohibits editing for the first write data and second write data stored in the storage.

5. The media processing apparatus according to claim 1, wherein when the receiving section receives, from the control apparatus, a media close command that commands execution of close processing on the medium, the controller terminates writing to the N media.

6. A method of controlling a media processing apparatus that communicates with a control apparatus, the media processing apparatus having N data writing units configured to write data, N being an integer equal to or greater than 2, and a printing unit configured to perform printing, the method comprising:

receiving, from the control apparatus, first write data and creation count information indicating a number K of media on which to perform media creation, K being an integer not greater than 2N; and when K is greater than N,
storing the received first write data,
writing the first write data to N media by using the N data writing units,
receiving, after the first write data is received, second write data from the control apparatus,
storing the second write data,
adding the second write data to the N media by using the N data writing units, and
after writing to the N media is terminated,
printing an image on label surfaces of the N media by using the printing unit, and
writing the stored first write data and the stored second write data to (K−N) media.

7. The method according to claim 6, further comprising starting, while printing on the label surface of one of the N media is in progress, writing to one of the (K−N) media.

8. The method according to claim 6, further comprising deleting, after media creation is terminated on the (K−N) media, the first write data and the second write data.

9. The method according to claim 6, further comprising prohibiting editing for the stored first write data and the stored second write data.

10. The method according to claim 6, further comprising terminating, when a media close command that commands execution of close processing on the medium is received from the control apparatus, writing to the N media.

* * * * *